United States Patent [19]

Ishikawa

[11] Patent Number: 4,480,892
[45] Date of Patent: Nov. 6, 1984

[54] LIGHT BEAM DEFLECTING APPARATUS
[75] Inventor: Hiromi Ishikawa, Kanagawa, Japan
[73] Assignee: Fuji Photo Film Co., Ltd., Japan
[21] Appl. No.: 485,363
[22] Filed: Apr. 15, 1983
[30] Foreign Application Priority Data

Apr. 16, 1982 [JP] Japan ............................... 57-63418

[51] Int. Cl.$^3$ ............................................. G02B 27/17
[52] U.S. Cl. ..................................... 350/3.71; 350/6.2
[58] Field of Search ..................... 350/3.7, 3.71, 6.1, 350/6.2, 6.3, 6.4

[56] References Cited

U.S. PATENT DOCUMENTS

| | | | |
|---|---|---|---|
| 3,797,908 | 3/1974 | Ward et al. | 350/6.4 |
| 3,953,105 | 4/1976 | Ih | 350/3.71 |
| 4,113,343 | 9/1978 | Pole et al. | 350/3.71 |
| 4,327,959 | 5/1982 | Minoura et al. | 350/6.3 |
| 4,383,168 | 5/1983 | Luck, Jr. | 350/6.2 |

Primary Examiner—Bruce Y. Arnold
Assistant Examiner—William Propp
Attorney, Agent, or Firm—Sughrue, Mion, Zinn, Macpeak and Seas

[57] ABSTRACT

Light beam deflecting apparatus comprised of a hologram formed on the peripheral surface of an open-topped hollow cylinder or on a flat disc rotating at a constant rotational speed. A wavefront control device is provided for adjusting the wavefront of the illuminating light proceeding towards the hologram or that of the scanner light diffracted from the hologram in response to electrical signals applied thereto from a control circuit. These electrical signals are changed in association with the scanning of the diffracted beam so as to enable the diffracted light beam to sweep with its focal point running along a straight line on a flat scanning plane.

10 Claims, 8 Drawing Figures

LIGHT BEAM DEFLECTING APPARATUS

BACKGROUND OF THE INVENTION

1. Field of the Invention

This invention relates to light beam deflecting apparatus, and more particularly to such apparatus in which a light beam is deflected or swept by means of a hologram.

2. Description of the Prior Art

Light beam scanning technique utilizing the nature of a hologram has many advantages over that employing a rotating polygonal mirror. For example, a hologram scanner is producible by an unsophisticated machining operation, and may considerably be reduced in size because the hologram itself has the focusing function without light condensing lenses. In addition, a number of copies of holograms can be prepared from a single original hologram.

While the hologram scanner can be used in conjunction with a variety of image recording and read-out apparatus such as a laser printer or a facsimile system, it has not been possible with the conventional hologram scanner to accomplish a perfectly straight-line scanning by which a straight scanning line is formed on a flat scanning plane.

In a facsimile system, for instance, both a document and a recording sheet of paper as recording media are usually placed in flat positions. If the system were adapted, to curvilinear scanning, then not only would the overall system be complex in structure, but increased in cost, complicated in handling of the recording media and lowered in operability of the system. Therefore, flat surface scanning should preferably be employed in conjunction with a image recording and read-out system of the type as mentioned above.

A hologram is usually prepared by irradiating a sheet or plate of photosensitive material with a plane or spherical wave beam as a reference beam together with a spherical wave beam emanating from a fixed point as a signal beam to form a pattern of diffractive gratings on the photosensitive sheet or plate. If a reproducing illuminating light emanating from such a fixed point is employed to deflect a scanning beam by means of a rotating hologram, then the focal point or converging point of the reproduced scanner light beam is kept positioned at a predetermined distance from the center of rotation of the hologram since the point from which the spherical wave light emanates is fixed. Therefore, when the scanner beam reproduced from the hologram is deflected or swept by changing the relative position between the hologram and the reproducing illuminating light, for example, by rotating a hollow cylinder of which on the cylindrical surface a hologram is formed, the converging points of the scanner light beam delineate an arc of a circle, failing to accomplish a desired flat surface scanning.

In the case of rotating a disk on which a hologram is formed with a reproducing illuminating light impinging thereupon, the curve delineated by the converging points of the scanner light beam is more complex. In this case, the scanner light beam is kept formed on the lateral surface of a cone frustrum having an apex on the rotational axis of the disk hologram. Therefore, not only does the focal point of the scanner light beam describe an arc, but the scanner beam itself is not formed, in this case, on one flat scanning plane. Therefore, when the scanning beam describing the lateral surface of a cone in this manner is used for scanning a flat image, a reproduced image may be distorted.

SUMMARY OF THE INVENTION

It is therefore an object of the present invention to provide light beam deflecting apparatus in which the wavefront of the scanner beam may be controlled in a desired manner, being free from the drawbacks of the prior art system discussed above.

It is a more specific object of the present invention to provide light beam deflecting apparatus capable of performing a sweep movement of a light beam with its converging point running along a substantially straight line on a scanning plane.

In accordance with the present invention, a realtime control is made on the wavefront of a reproducing illuminating light impinging on a hologram or of a diffracted beam from the hologram. This wavefront control is accomplished by a wavefront control device which adjusts on a real time basis the direction and the focal or converging point of an illuminating light and/or a diffracted light in associated with the sweep movement of a scanning beam. The wavefront control device is capable not only of adjusting in position the focal point of the beam, but correcting aberrations, so that the various aberrations inherent in the optical system may be corrected by adjusting the wavefront in the aforementioned manner.

Light beam deflecting apparatus in accordance with the present invention comprises sweeping means having a hologram adapted for producing a diffracted light beam from an incident light thereto for changing the position of said hologram relative to the incident light to sweep the diffracted light beam, waveform control means placed in the path of either of the incident light and of the diffracted light and responsive to electrical signals applied thereto for controlling the wavefront of said either of the incident light beam and the diffracted light beam, and a control circuit responsive to the sweeping of the diffracted light beam by said sweeping means for applying the electrical signals to said wavefront control means, said control circuit being operative for adjusting the electrical signals in association with the sweep movement of the diffracted light beam in such a manner that the focal or converging points of the diffracted light beam delineate a substantially straight line on a flat scanning plane.

BRIEF DESCRIPTION OF THE DRAWINGS

The objects and features of the present invention will become more apparent from a consideration of the following detailed description and the accompanying drawings in which.

DESCRIPTION OF THE PREFERRED EMBODIMENTS

Figure 1A:
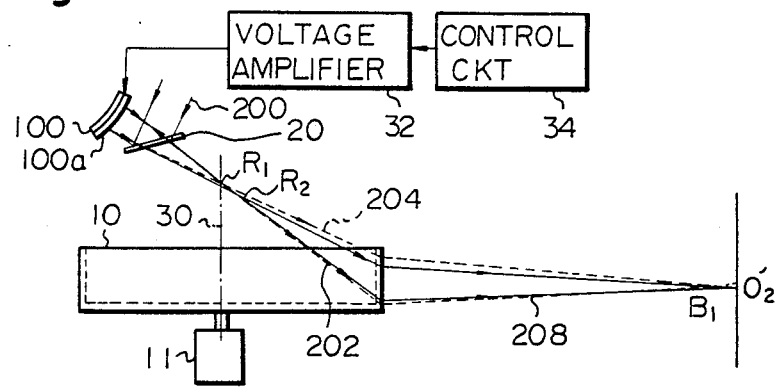
FIG. 1A is a partially schematic and partially diagramic side view showing an embodiment of light beam deflecting apparatus in accordance with the present invention.
Figure 1B:
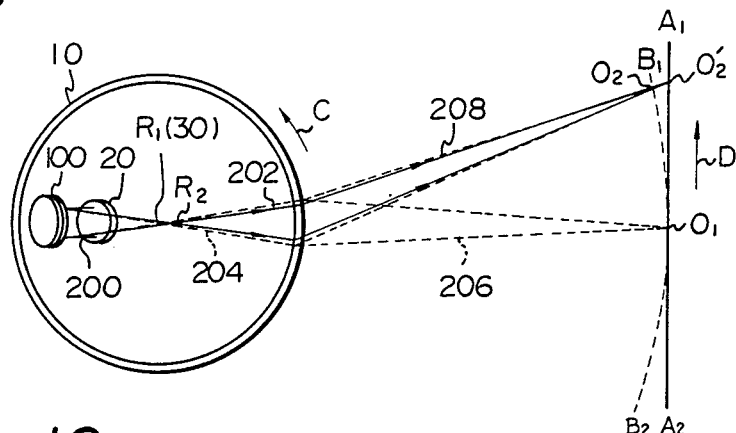
FIG. 1B is a plan view of the system shown in FIG. 1A.

With reference to FIGS. 1A and 1B, illustrating schematically an embodiment of light beam deflecting apparatus in accordance with the present invention, the apparatus includes a cylindrical hologram 10 which is driven in rotation at a constant speed about a central axis 30 by driving means 11 such as an electrical motor. The hologram 10 is advantageously comprized of an open-topped hollow cylinder. A diffractive grating pattern is formed on the transparent peripheral wall of the cylinder by using a diverging illuminating light virtually emanating from a point R1 on the central axis 30 as a reference wave together with a converging spherical wave as an object wave in the manner well-known in the art.

In the present embodiment, as shown in FIG. 1, a half mirror 20 and a deformable mirror 100 are placed in tandem. The deformable mirror 100 is formed of a flat glass plate 100b having a silver layer deposited by vacuum evaporation on its one surface for providing a mirror or reflective surface 100a, and a layer of piezoelectric material 100c such as PZT or polyvinylidene fluoride (PVDF) on its other surface, as shown in section in FIG. 2. Therefore, a bending moment is produced on application of an electrical field across the piezoelectric layer 100c, resulting in deformation of the mirror surface 100a. The deformation is a function of voltage distributions across the piezoelectric layer 100c.

Figure 3A:
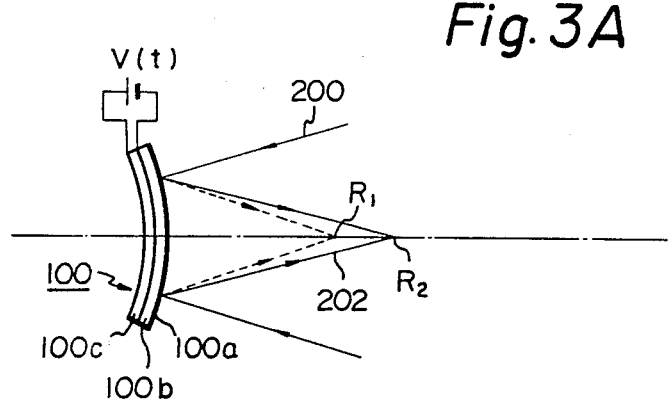
FIG. 3A is a schematic side view of the control device shown in FIG. 2 with the paths of the light beams illustrated.

Assuming that a converging light 200 falls on the deformable mirror 100 as shown in FIG. 3A, the light reflected by the mirror is converged at a point R1. On application of a uniform voltage V to the overall surface of the piezoelectric layer 100c, the focal point R1 of the reflected light 202 is shifted from the point R1 to a point R2, depending on the magnitude of the applied voltage V. In this manner, the focal point can be controlled by changing the magnitude of the applied voltage. When the applied voltage is not uniform but the voltage distribution is different over the entire surface of the piezoelectric layer 100c, the mirror 100 acts as a wavefront control device capable of controlling the various aberrations as well as the direction of the incident light beam thereto.

Figure 3B:
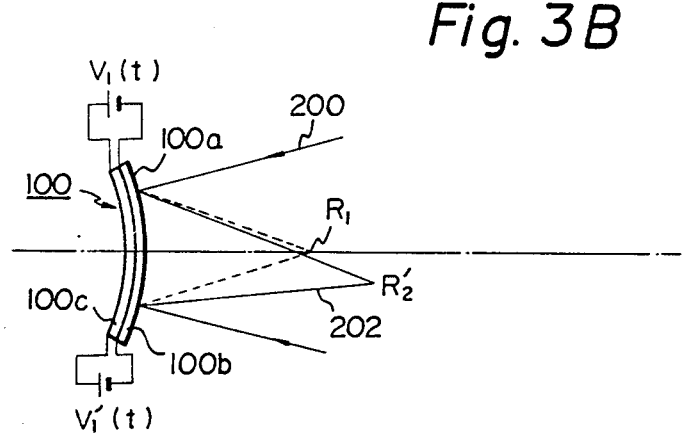
FIG. 3B is a view similar to FIG. 3A and showing a modification of the control device used in the light deflecting apparatus of FIG. 4.

With a mirror system shown in FIG. 3B, not only the focal point but the direction of the reflected light can be changed simultaneously. Two separate voltage sources V1 and V1' are connected to the piezoelectric layer 100c so that the distribution of the applied voltage to the layer 100c will not be uniform in the upper and lower portions of the piezoelectric layer 100c. In other words, the voltage distribution will not be symmetrical with respect to the optical axis. In this manner, the focal point of the converging light 200 can be shifted from the point R1 to a point R2', in a direction offset from the optical axis. The thickness as well as configuration of the piezoelectric material may also be selected for affording a distribution of the applied voltage to the deformable mirror, best suited for correcting various aberrations.

Figure 1C:
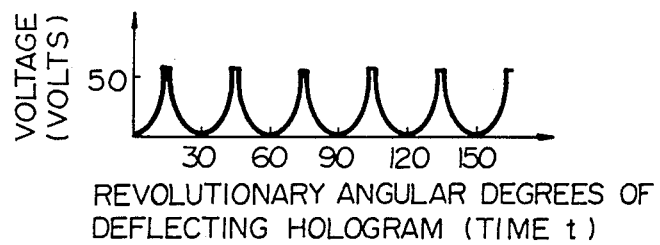
FIG. 1C depicts the waveform of the control voltage applied to the wavefront control device included in the system shown in FIGS. 1A and 1B.
Figure 2:
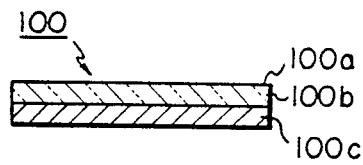
FIG. 2 is a schematic front view of a wavefront control device employed in the apparatus shown in FIGS. 1A and 1B.

Reverting again to FIG. 1A, the deformable mirror 100 is connected to a control circuit 34 through a voltage amplifier 32. As will be described below in more detail, the function of the control circuit 34 is to apply to the deformable mirror 100 an electrical voltage that is changed in accordance with a predetermined program schedule and in timed relation to the rotation of the hologram 10 effected by the drive source 11 (FIG. 1C).

The converging light beam 200 is shown in FIG. 1A to be incident on the half mirror 20. In the case of application of the present light beam deflecting apparatus to, for instance, a laser printer, this light beam 200 may be modulated in an acoustooptic modulator, not shown, with electrical signals, which carries information about an object to be recorded. This light beam 200 is reflected by the half mirror 20 to arrive at the mirror surface 100a of the deformable mirror 100. The mirror 100 is so designed that, in its normal state, in which any voltage is not applied to piezoelectric layer 100c, it reflects the light 200 getting thereto, after reflected by the half mirror 20, so as to make the light going out converge at a point R1 on the central axis 30 of the hologram 10 as indicated by a dotted line 204 in FIGS. 1A and 1B.

Since the peripheral surface of the cylindrical hologram 10 is illuminated in this case with the light beam virtually emanating from the point R1, supposing that the deformable mirror 100 is maintained in this state and the hologram 10 is continuing its rotation, the scanner light beam is converged at a point on an arc B1 B2 as shown in FIG. 1B. This is because the light illuminating the hologram 10 is always emanating from the point R1, and hence the light 206 diffracted by the hologram 10 is converged at a point located at a predetermined distance from the rotational axis 30 such as point 01 or 02 no matter in which directions the light 206 is diffracted by the hologram.

Such an arcuate scanning can be converted, in accordance with the present invention, into straight-line scanning by means of the control circuit 34 which acts for adjusting the voltage to be applied across the deformable mirror 100 in timed relation with the sweep movement of the scanner beam 206. Thus the electrical voltage applied to the mirror 100 is changed in such a manner that, when the scanner beam from the hologram 10 proceeds along the solid line 208 shown in FIG. 1B, the light reflected by the mirror 100 is not converged at the point R1 but at a point R2 further away than the point R1 from the mirror 100. Thus the beam 208 is converged at a point 02' on a straight line A1 A2, which is perpendicular to the drawing plane of FIG. 1A. Therefore, when the hologram 10 is rotated at a predetermined speed in the direction of the arrow mark C in FIG. 1B, the scanner beam is moved in the direction of the arrow mark D as from beam 206 to beam 208.

Since the electrical voltage impressed across the mirror 100 is changed continuously for smoothly shifting the converging point of the illuminating light from point R1 to point R2, the converging point of the scanner beam, moving from beam 206 to beam 208, is shifted continuously from point 01 to point 02' on the straight line A1A2 in the direction of the arrow mark D in FIG. 1B. In other words, control circuit 34 includes a programmed schedule which varies the voltage applied to mirror 100 in such a manner that the larger the diffractive angle of the scanner beam 206 to displace the converging point further away from point 01, the higher the voltage applied across the mirror 100 to increase the curvature of the mirror surface 100a.

FIG. 1C shows a typical control voltage waveform to be applied to the wavefront control device such as shown in FIGS. 1A and 1B. The rotational angle θ of the cylindrical hologram 10 is plotted on the abscissa. Since the hologram 10 is rotated at a constant speed, the voltage is changed as shown in the figure with respect to the time elapsing. In an example twelve pieces of hologram of the same object are placed in effect on the circumference of a cylinder having a diameter equal to a hundred millimeters, and the piezoelectric material (PZT-8) is used as a wavefront control device for converting the arcuate scanning its a straight line scanning.

Figure 4:
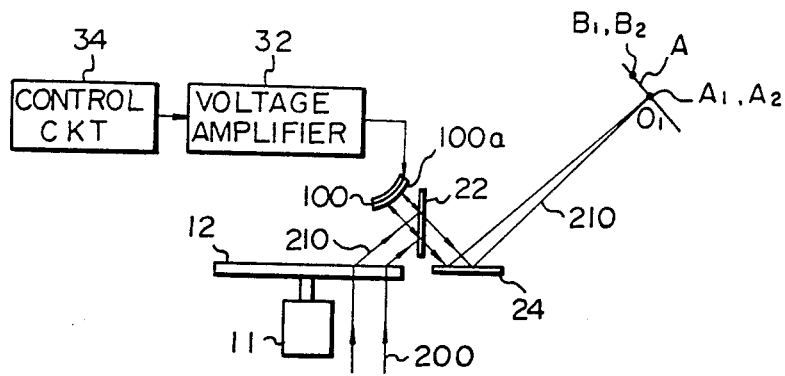
FIG. 4 is a schematic side view showing another modification of the light beam deflecting apparatus.

In the illustrative embodiment discussed with reference to FIGS. 1A and 1B, the converging points of the light-beam 202 or 204 illuminating the hologram 10 are changeable by the deformable mirror 100. Alternatively, the converging point of the light beam diffracted by the hologram 10 may be changeable by the deformable mirror 100, as shown in FIG. 4. In this Figure, the elements same as or similar to those shown in FIGS. 1A and 1B are denoted by the same reference numerals.

Figure 5:
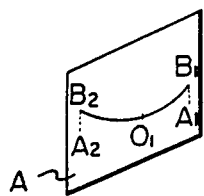
FIG. 5 is a schematic view useful for understanding the flat plane scanning performed by the apparatus shown in FIG. 4.

In the FIG. 4 embodiment, a hologram 12 is formed on a disk which is rotated at a constant speed. The light diffracted by this hologram 12 is in turn reflected by the half mirror 22 to fall on the deformable mirror 100. The light reflected by the mirror surface 100a of the deformable mirror 100 is transmitted through the half mirror 22, and then reflected by the mirror 24 to be converged at a distant point 01. Should the hologram 12 be rotated with the mirror 100 remaining in its normal state, then the plane wave 200 incident on the hologram 12 would be diffracted in different directions in association with rotation of the hologram 12. Therefore, the converging points of the beam on the scanning plane A would delineate an arc B1B2 as shown in FIG. 5 with the converging points being offset from the scanning plane A1 except the point 01.

Such complex arcuate scanning will be corrected, in accordance with the present invention, into a completely linear or planar scanning by adjusting the distribution of the electrical voltage applied across the piezoelectric layer 100c of the mirror 100 to thereby control the direction and position of focal points of the scanner beam 210. For instance, if the scanner beam 210 would otherwise be directed to point B1 in FIG. 5, then control circuit 34 provides the mirror 100 with the voltage distribution which is so arranged that the scanner beam is directed to the point A1 and further converged at the point A1. In FIG. 5, the line including points A1, 01 and A2 is included in a scanning plane A passing through the point 01. As already described with reference to FIG. 3B, the control circuit 34 is adapted for changing the voltage distribution across the mirror 100 in accordance with a predetermined program in timed relation with the constant speed rotation of the hologram disk 12. In this manner, the converging points of the scanner beam 210 may at all times delineate a length of straight line A1A2 included within the scanning plane.

While the particular embodiments of the light beam deflecting apparatus in accordance with the present invention have been described in the foregoing, those are not limitative to the scope of the present invention. For instance, in the embodiment shown in FIGS. 1A and 1B, the hologram 10 need not be in the form of a circular cylinder, but may also be an open-topped polygonal cylinder having a plurality of flat facets making up the peripheral surface of the polygonal cylinder. While a half mirror is provided in the embodiments of FIGS. 1A, 1B and 4 for better understanding of the invention, it is not essential and may be omitted if desired. In addition, the piezoelectric layer 100c used as a part of the deformable mirror 100 in the above embodiments may be replaced by a flat magnetic member similarly bonded to the mirror surface, and an electromagnet is placed in the vicinity of the magnetic member. In the latter case, the curvature of the deformable mirror may be controlled by changing the magnetic field produced by the electromagnet. Besides the deformable mirror, an acoustooptic effect device, magnetooptic effect device or electrooptic effect device may be used as such a wavefront control device. For instance, with the use of a device the refractive index of which is changed under the electrooptic effect, a transmissive type wavefront control device may be provided in which the light beam transmitted therethrough is controllable by changing the electrical voltage applied across the device.

These wavefront control devices, whether they are of the reflecting or transmissive type, may be used for controlling both the wavefront of the illuminating light for the hologram and the wavefront of the scanner beam diffracted by the hologram. In addition, the wavefront control, discussed above, may be effected on not only the focus position, i.e. the radial distance of the converging points and the spot diameter of the scanner light beam, together with the light beam direction, but also various aberrations of the optical system. Thus, scanning may be made on a perfectly flat surface with the aberrations of the optical system compensated for.

It may be seen from the foregoing that the light beam deflecting apparatus in accordance with the present invention makes it possible to correct the position and direction of the converging point of a scanner beam as well as aberrations of the optical system through control over the wavefront of an illuminating light incident to a hologram, or that of a diffracted beam from the hologram. The light beam deflected by the hologram forms a substantially linear scanning line on a flat scanning plane.

What is claimed is:

1. Light beam deflecting apparatus comprising:
   sweeping means having a hologram for producing a diffracted light beam from an incident light thereto for changing the position of the hologram relative to the incident light to sweep the diffracted light beam;
   wavefront control means placed in the path of either of the incident light and the diffracted light beam and responsive to electrical signals applied thereto for controlling the wavefront of said either of the incident light and the diffracted light beam; and
   a control circuit responsive to the sweeping of the diffracted light beam by said sweeping means for applying the electrical signals to said wavefront control means, said control circuit being operative to adjust the electrical signals in association with the sweep movement of the diffracted light beam in such a manner that a converging point of the diffracted light beam delineates a substantially straight line on a scanning plane.

2. Light beam deflecting apparatus according to claim 1 wherein said wavefront control means comprises a light reflective layer for reflecting either of the incident light and the diffracted light beam, and a layer of piezoelectric material operative upon application of the electrical signals to cause said light reflective layer to bend to thereby affect the wavefront of the reflected light.

3. Light beam deflecting apparatus according to claim 1 wherein said sweeping means comprises a rotary member having said hologram on the peripheral surface thereof, said wavefront control means being arranged in the path of the incident light to said hologram.

4. Light beam deflecting apparatus according to claim 1 wherein said sweeping means comprises a rotary member in the form of a disk having said hologram thereon, said wavefront control means being arranged in the path of the diffracted light beam from said hologram.

5. Light beam deflecting apparatus according to claim 2 wherein said sweeping means comprises a rotary member having said hologram on the peripheral surface thereof, said wavefront control means being arranged in the path of the incident light to said hologram.

6. Light beam deflecting apparatus according to claim 2 wherein said sweeping means comprises a rotary member in the form of a disk having said hologram thereon, said wavefront control means being arranged in the path of the diffracted light beam from said hologram.

7. Light beam deflecting apparatus comprising:
sweeping means for sweeping a scanning light beam;
said sweeping means including a rotary cylindrical body drivable in rotation at a predetermined speed by motor means, and a hologram carried on a peripheral surface of said cylindrical body, said hologram being arranged in response to changing in relative position with respect to the incident light beam to sweep the scanning light beam;
wavefront control means provided in the path of the incident light beam, and being operative in response to electrical signals applied thereto to control the wavefront of the incident light beam; and
a control circuit responsive to the sweeping of the scanning light beam for applying the electrical signals to said wavefront control means, said control circuit being operative to adjust the electrical signals in timed relation to the sweeping of the scanning light beam to cause a converging point of the scanning light beam to follow a substantially straight line on a flat scanning plane.

8. Light beam deflecting apparatus according to claim 7, wherein said wavefront control means comprises a light reflective layer for reflecting the incident light beam, and a layer of piezoelectric material supporting said reflective layer thereon and being operative in response to the electrical signals to cause said reflective layer to bend so as to control the wavefront of the incident light beam.

9. Light beam deflecting apparatus comprising:
sweeping means for sweeping a scanning light beam;
said sweeping means including a rotary disc body drivable in rotation at a predetermined speed by motor means, and a hologram carried on said disk body, said hologram being arranged in response to changing in relative position with respect to the incident light beam to sweep the scanning light beam;
wavefront control means provided in the path of the scanning light beam, and being operative in response to electrical signals applied thereto to control the wavefront of the scanning light beam; and
a control circuit responsive to the sweeping of the scanning light beam for applying the electrical signals to said wavefront control means, said control circuit being operative to adjust the electrical signals in timed relation to the sweeping of the scanning light beam to cause a converging point of the scanning light beam to follow a substantially straight line on a flat scanning plane.

10. Light beam deflecting apparatus according to claim 9, wherein said wavefront control means comprises a light reflective layer for reflecting the scanning light beam, and a layer of piezoelectric material supporting said reflective layer thereon, and being operative in response to the electrical signals to cause said reflective layer to bend so as to control the wavefront of the scanning light beam.

* * * * *